United States Patent
Revers

(10) Patent No.: US 10,287,692 B2
(45) Date of Patent: May 14, 2019

(54) DIAPHRAGM-ELECTRODE ASSEMBLY FOR USE IN ALKALINE WATER ELECTROLYSERS

(71) Applicant: De Nora Tech Inc., Concord, OH (US)

(72) Inventor: Edward Eugene Revers, Concord, OH (US)

(73) Assignee: DE NORA TECH INC., Concord, OH (US)

( * ) Notice: Subject to any disclaimer, the term of this patent is extended or adjusted under 35 U.S.C. 154(b) by 371 days.

(21) Appl. No.: 15/054,205

(22) Filed: Feb. 26, 2016

(65) Prior Publication Data

US 2016/0289850 A1 Oct. 6, 2016

Related U.S. Application Data

(60) Provisional application No. 62/140,101, filed on Mar. 30, 2015.

(51) Int. Cl.
| | |
|---|---|
| *C25B 1/10* | (2006.01) |
| *C25B 9/08* | (2006.01) |
| *C25B 13/02* | (2006.01) |
| *C25B 11/03* | (2006.01) |
| *C25B 13/04* | (2006.01) |
| *C25B 11/04* | (2006.01) |

(52) U.S. Cl.
CPC .............. *C25B 1/10* (2013.01); *C25B 9/08* (2013.01); *C25B 11/035* (2013.01); *C25B 11/04* (2013.01); *C25B 13/04* (2013.01); *Y02E 60/366* (2013.01)

(58) Field of Classification Search
CPC ........... C25B 1/10; C25B 13/04; C25B 13/08; C25B 9/08; C25B 9/10
See application file for complete search history.

(56) References Cited

U.S. PATENT DOCUMENTS

| | | | |
|---|---|---|---|
| 2002/0106550 A1* | 8/2002 | Nishiki | ............... H01M 8/1004 |
| | | | 429/494 |
| 2011/0089027 A1* | 4/2011 | Sasaki | ................. C25B 11/0484 |
| | | | 204/242 |

OTHER PUBLICATIONS

Vermeiren et al; "Electrode diaphragm electrode assembly for alkaline water electrolysis" International Journal of Hydrogen Energy, 34, 2009, p. 9305-9315 (Year: 2009).*

* cited by examiner

*Primary Examiner* — Brian W Cohen
(74) *Attorney, Agent, or Firm* — Lucas & Mercanti, LLP

(57) ABSTRACT

An assembly of a porous gas-evolving electrode and a porous separator diaphragm, suitable for use in a water electrolyzer operating with an alkaline electrolyte is disclosed. A water electrolyzer having the gas-evolving electrode component of the assembly arranged as the cathode allows manufacturing hydrogen with a purity exceeding 99.8%.

12 Claims, No Drawings

DIAPHRAGM-ELECTRODE ASSEMBLY FOR USE IN ALKALINE WATER ELECTROLYSERS

CROSS-REFERENCE TO RELATED APPLICATIONS

This application claims the benefit of U.S. Provisional Application No. 62/140,101 filed on Mar. 30, 2015 the contents of which is incorporated herein by reference.

FIELD OF THE INVENTION

The invention relates to electrolysis of alkaline solutions, such as caustic soda or caustic potash, for manufacturing hydrogen and oxygen gas.

BACKGROUND OF THE INVENTION

The invention relates to industrial alkaline water electrolysis, i.e. to electrolysis of alkaline electrolytes such as caustic soda or caustic potash, aimed at the production of highly pure hydrogen gas in large scale.

Water electrolysis cells known in the art can be grouped into two families according to the separator used, namely cells equipped with gas-tight ion-exchange membranes and cells equipped with porous diaphragms.

Membrane cells normally permit the production of high purity hydrogen by virtue of the gas-tight properties of the membrane, acting as a hydraulically impermeable wall; oxygen can thus penetrate to the cathodic compartment only by solid state diffusion across the polymer structure. On the other hand, some serious drawbacks are associated with the use of ion-exchange membranes, which are affected by a significant ohmic drop especially at the high current density regime which is required by mass production of hydrogen. The resistive penalty is not only due to the intrinsic properties of the material, which relies on ion conduction in a polymer matrix rather than in aqueous phase, but also to the need of equipping such membranes with an internal reinforcement, such as a PTFE web, for ensuring the required reliability in terms of mechanical properties and dimensional stability for large scale systems. Besides imposing an increase in the thickness of the membrane in which it is embedded, the reinforcement web reduces the polymer section available for ion migration: the unavoidable consequence of these two combined factors is a further increase of ohmic drop. The use of non-reinforced membranes in water electrolysis cells has been described, but the results in terms of reliability of operation proved largely unsatisfactory.

Diaphragm cells known in the art present opposite characteristics and drawbacks. On one hand, the electrolyte which fills the internal porosity of the diaphragm allows to operate with much lower ohmic drops even at very high current densities; on the other hand, the hydrogen purity is severely penalised by the oxygen travelling across the diaphragm. This inconvenience is caused by the diffusion rate of oxygen in the liquid phase filling the porosity, much higher than diffusion rate across the polymer structure of an ion-exchange membrane. In addition, a certain fraction of the diaphragm porosity is usually filled with gas, as the result of the balance between hydrophilicity and hydrophobicity of the diaphragm material. Therefore, the production of low purity hydrogen is an intrinsic characteristic of all porous diaphragm cells.

In an attempt to reduce the cell voltage and increase the purity of product hydrogen in diaphragm cells, Vermeiren et al. disclosed (International Journal of Hydrogen Energy 34(2009), 9305-9315) the use Electrode Diaphragm Electrode assemblies (EDE) obtained by casting as a single unit comprising the anode, the diaphragm and the cathode, wherein the electrode component is either a cast or a non-woven nickel electrode. In this way, a reasonably reduced and stable cell voltage with a fair oxygen purity can be obtained at moderate current densities, e.g. 2 kA/m$^2$; however, stable operation at high current density (such as 4 kA/m$^2$) cannot be attained with this arrangement and hydrogen purity remains still far from what obtainable with a membrane cell. Vermeiren et al. attribute such phenomena to lack of understanding of the relation between operating working conditions and performances, also suggesting the fact that electrode porosity should probably be increased.

There has thus been evidenced the need of providing a water electrolysis cell capable of providing high purity hydrogen at high current density and extremely low voltage, especially for large scale hydrogen production applications.

SUMMARY OF THE INVENTION

Various aspects of the invention are set out in the accompanying claims.

Under one aspect, the invention relates to an assembly of a gas-evolving electrode and a porous separator diaphragm, optionally a polymeric diaphragm, suitable for use in a water electrolyser operating with an alkaline electrolyte, wherein one major surface of a generally planar separator diaphragm comprising inorganic hydrophilic particulates dispersed in a porous network and one major surface of a generally planar gas-evolving electrode made of a porous body having a pore size below 100 µm containing an electrocatalyst dispersed in a conductive matrix are arranged in mutual direct contact without penetration. In one embodiment, the porous body is a mesoporous or microporous body. Contrarily to the assumptions of Vermeiren et al., providing a gas-evolving electrode with a very fine porosity such as a catalyst-activated mesoporous or microporous body proved beneficial in terms of water management and of product hydrogen purity. The term "mesoporous body" is used in this context to mean a material having pore diameters between 2 nm and 50 nm. The term "microporous body" is used in this context to mean a material having pore diameters below 2 nm. The above definitions are consistent with the IUPAC references issued in Rouquerol, J. et al. (1994). "Recommendations for the characterization of porous solids", Pure and Appl. Chem. 66: 1739-1758, which are familiar to those skilled in the art. The term electrocatalyst is used in this context to mean a catalyst capable of reducing the overvoltage of the hydrogen evolution reaction (HER). In one embodiment, the electrocatalyst is either an unsupported or a supported (for instance carbon-supported) catalyst containing an element of the platinum group or an oxide or compound thereof, but other electrocatalysts, e.g. based on Ni or Ni—Mo alloys, can also be used. The inventors have surprisingly found that a diaphragm cell equipped with the assembly of the invention, wherein the gas-evolving electrode component is used as hydrogen-evolving cathode, coupled to an anode mesh of the prior art as the counterelectrode, allows manufacturing hydrogen having a purity typical of membrane water electrolysis cells at a voltage typical of diaphragm water electrolysis cells without any problems of scalability. In one embodiment, the porous network of the separator diaphragm component is a polymeric network. In one embodiment, the inorganic hydrophilic particulates dispersed in the porous network of the separator comprise a zirconium oxide material optionally mixed with an organic binder. This can have the advantage of facilitating a fine tuning of the hydrophilic and hydrophobic properties of the diaphragm component, which needs to be provided with a proper wettability in order to be filled with electrolyte (imparted by zirconium oxide) and at the same time with suitable properties of gas release, mechanical and chemical stability (imparted by the network and by the optional organic binder, which can be made of fluorinated polymers such as PTFE or PPS).

In one embodiment, the electrocatalyst contained in the gas-evolving electrode component contains ruthenium, for instance in the form of unsupported ruthenium dioxide or of carbon-supported ruthenium or ruthenium oxide. The inventors have surprisingly found that ruthenium-based catalyst allow a combination of cell voltage and hydrogen purity even superior to the far more expensive platinum, which is normally considered as the preferred choice of noble metal in the field of membrane water electrolysis cells in which it is normally used. The porous body of the gas-evolving electrode component can have a conductive matrix chosen in a range of metallic and conductive carbon materials. In one embodiment, a mesoporous or microporous body in form of a carbon web, such as an optionally graphitised knit, woven or non-woven carbon cloth is used as porous body. The inventors have observed that flexible carbon webs ensuring an intimate contact with the separator diaphragm component generally perform better than metallic components such as sintered metals or metal cloths. The porous body of the gas-evolving electrode component should preferably be free of polymer components: it has been observed that, besides the intrinsic increase in electrical resistivity and brittleness associated to the presence of polymer components in the porous body of the electrode, polymer components also tend to favour some interpenetration of the electrode component into the diaphragm component. In such conditions, the maximum current density that can be achieved in stable conditions decreases and the cell voltage has a general tendency to increase.

In one embodiment, the electrocatalyst is not uniformly dispersed in the gas-evolving electrode body, the distribution presenting instead a gradient, wherein the maximum catalyst concentration is in correspondence of the surface put in contact with the separator diaphragm component. While the penetration of the catalyst in the interior of the porous body up to a certain extent was found to be beneficial in terms of enhanced hydrogen purity, providing a higher concentration of catalyst towards the surface facing the diaphragm was found to be more effective in improving the cell voltage. In one embodiment the gas-evolving electrode component according to the invention contains 1 to 20 $g/m^2$ of a ruthenium catalyst dispersed inside a 200 to 500 μm-thick microporous carbon cloth, wherein at least 80% of the catalyst loading is confined in a 10 to 20 μm-thick layer in correspondence of the surface facing the separator diaphragm component. A person skilled in the art can however find out other suitable catalyst distributions across the electrode thickness without departing from the scope of the invention. In one embodiment, the surface of the gas-evolving electrode component in direct contact with the separator diaphragm component is coated with a layer of an ionomer, such as a film obtained by deposition of Nafion® perfluorosulphonated ion exchange solution commercialised by E.I. du Pont de Nemours and Company. This can have the double advantage of assisting the balance adjustment between the hydrophobic and hydrophilic properties of the electrode surface, so that the optimal wetting of the catalyst particles is ensured without arriving to a complete flooding, while further helping to prevent the partial interpenetration of the gas-evolving electrode and separator diaphragm components. The assembly according to the invention can be manufactured by hot pressing together a separator diaphragm and gas-evolving electrode as hereinbefore described; the suitable temperature and pressure conditions for obtaining a standalone non-penetrated assembly can be readily determined by a person skilled in the art. In another embodiment, the assembly can be obtained in situ, by separately assembling the two components in close contact inside a water electrolysis cell and relying on the tightening pressure and operating temperature to obtain an efficient assembly in just a few hours of functioning. A tightening pressure of 0.1 to 0.25 $kg/cm^2$ and an operating temperature of 70 to 90° C. were found to be suitable conditions for all assemblies tested in the course of an extensive campaign.

Under another aspect, the invention relates to an alkaline water electrolyser comprised of a stack of separated electrolysis cells containing an assembly of one gas-evolving electrode and one porous separator diaphragm as hereinbefore described, in which the gas-evolving electrode is arranged as the cathode and a tightening pressure of 0.1 to 0.25 $kg/cm^2$ is applied over the major surfaces of the assembly by means of internal elastic pressure distributors, e.g. metal mats or foams, coupled with suitable tightening means such as tie-rods or hydraulic jacks. The electrolysis cells can be arranged in a laminar, filter press-type bipolar stack, or in any other type of modular arrangement known in the art. In one embodiment, the cell is also equipped with an anode consisting of a mesh facing the assembly on the side opposite the gas-evolving electrode component; the anodic mesh, which can be spaced apart from the separator diaphragm component by a few millimeters, can be a metallic mesh, for instance a nickel mesh, optionally coated with an electrocatalyst suitable for decreasing the overvoltage of the oxygen evolution reaction (OER).

Under yet another aspect, the invention relates to a process for manufacturing hydrogen with a purity exceeding 99.8% and preferably exceeding 99.9%, comprising feeding an alkaline electrolyte to the electrolyser as hereinbefore described connected to a current rectifier or other direct power source and applying a direct current, typical in a current density range of 1 to 12 $kA/m^2$. In one embodiment, the alkaline electrolyte is a caustic soda or caustic potash solution at a 5 to 30% weight concentration.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

A series of assemblies according to the invention were characterised in a lab test electrolyser. The electrolyser consists of two nickel end plates coupled to corresponding cell frames, aligned by aid of plastic guide rods inserted into one of the end plates. The remaining components are assembled by stacking according to a filter press geometry, with the first plastic terminal frame followed by the nickel anodic terminal plate and, stacked thereupon, the first anodic frame with the first anode and a resilient porous current distributor included within. Next the separator diaphragm component is placed, followed by the cathodic frame and the gas-evolving electrode component. A nickel bipolar plate is then placed delimiting the first elementary cell and the whole cycle of operations repeated for the subsequent elementary cells. After placing the final cathodic frame and gas-evolving electrode component, the nickel cathodic terminal plate is arranged, followed by the final plastic terminal frame and the opposing end plate. Finally the electrolyser is sealed and tightened by means of stainless steel tie rods. For the test campaign, anodes consisting of uncoated nickel meshes were used in all instances. The assembled electrolyser was connected to a plant wherein two independent recirculating electrolytes having the same starting composition are driven by two separate pumps. Each of the thus delimited recirculating loops has a gas separating chamber, vented to a heat exchanger.

EXAMPLE 1

Four elementary cells were assembled coupling a 500 μm thick separator diaphragm component having zirconium oxide particles with an average size of 1 μm embedded in a polyphenylene sulphide (PPS) network with a gas-evolving electrode component containing 5 g/m$^2$ of carbon black-supported ruthenium (40% Ru/C) dispersed in a 400 μm thick microporous carbon cloth. A distribution gradient was obtained so that 90% of the catalyst loading was confined in the outermost 20 μm-thick layer, which was then coated with a 5 g/m$^2$ Nafion® layer: the Nafion®-coated side was the one later arranged in direct contact with the separator diaphragm component. The thus obtained electrolyser was fed with 25% wt. KOH from both sides, pre-heated at 80° C., and direct current was applied to the cell. The hydrogen gas was analysed from the catholyte loop and its purity determined in terms of oxygen content. Feeding a current of 25.2 A, corresponding to 4 kA/m$^2$, a cell voltage of 1.71 V was obtained and a hydrogen purity of 99.98% was detected.

EXAMPLE 2

The test of Example 1 was repeated in the same conditions and with the same components except the catalyst of the gas-evolving electrode component, which was 5 g/m$^2$ carbon black-supported platinum (30% Pt/C). A cell voltage of 1.72 V was obtained, with a hydrogen purity of 99.95%.

EXAMPLE 3

The test of Example 1 was repeated in the same conditions and with the same components except the separator diaphragm component used had a thickness of 200 μm. A cell voltage of 1.70 V was obtained, with a hydrogen purity of 99.95%.

EXAMPLE 4

The test of Example 2 was repeated in the same conditions and with the same components except the separator diaphragm component used had a thickness of 120 μm. A cell voltage of 1.72 V was again obtained, with a hydrogen purity of 99.89%.

EXAMPLE 5

The test of Example 1 was repeated in the same conditions and with the same components except that the 40% Ru/C catalyst in the gas-evolving electrode component was dispersed in a 400 μm thick macroporous carbon cloth having a pore size distribution between 10 and 50 μm. A cell voltage of 1.79 V was obtained and a hydrogen purity of 99.90% was detected.

EXAMPLE 6

The test of Example 1 was repeated in the same conditions and with the same components except that the catalyst of the gas-evolving electrode component was distributed evenly across the thickness of the carbon cloth. A cell voltage of 1.76 V was obtained and a hydrogen purity of 99.98% was detected.

COUNTEREXAMPLE 1

The test of Example 2 was repeated in the same conditions and with the same components except that the gas-evolving electrode component was replaced with a nickel mesh with 1 mm-wide openings activated with 12 g/m$^2$ of Ru catalyst. A cell voltage of 1.72 V was obtained, with a hydrogen purity of 97.13%.

COUNTEREXAMPLE 2

The test of Example 2 was repeated in the same conditions and with the same components except that the separator diaphragm component was replaced with a 200 μm thick PTFE-reinforced Nafion® N438 membrane. A cell voltage of 1.99 V was obtained, with a hydrogen purity of 98.9%.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:
1. Assembly consisting of one gas-evolving electrode and one porous separator diaphragm wherein:
    said separator diaphragm comprises inorganic hydrophilic particulates dispersed in a porous network;
    said gas-evolving electrode is a porous body with a pore size below 100 μm comprising a conductive matrix having an electrocatalyst dispersed therein;
    said gas-evolving electrode having a surface in direct contact without penetration with said separator diaphragm;
    wherein said porous body is a mesoporous or microporous body; and
    wherein the gas-evolving electrode contains at least 80% of the catalyst loading in a 10 to 20 μm-thick layer of the porous body in correspondence of the surface facing the separator diaphragm component, the porous body having a thickness of 200-500 μm.

2. The assembly according to claim 1, wherein said porous network of the separator diaphragm is made of a polymer and said inorganic hydrophilic particulates comprise zirconium oxide.

3. The assembly according to claim 1, wherein said electrocatalyst is carbon-supported ruthenium or ruthenium oxide.

4. The assembly according to claim 1, wherein the concentration of said dispersed electrocatalyst has a gradient along its thickness with a maximum value in correspondence of said surface of said gas-evolving electrode in direct contact with said separator diaphragm.

5. The assembly according to claim 1, wherein said surface of said gas-evolving electrode in direct contact with said separator diaphragm is coated with an ionomer layer.

6. Alkaline water electrolyser comprising at least one electrolysis cell containing:
   an assembly consisting of one gas-evolving electrode and one porous separator diaphragm wherein:
   said separator diaphragm comprises inorganic hydrophilic particulates dispersed in a porous network;
   said gas-evolving electrode is a porous body with a pore size below 100 μm comprising a conductive matrix having an electrocatalyst dispersed therein;
   said gas-evolving electrode having a surface in direct contact without penetration with said separator diaphragm;
   wherein said porous body is a mesoporous or microporous body; and
   wherein the gas-evolving electrode contains at least 80% of the catalyst loading in a 10 to 20 μm-thick layer of the porous body in correspondence of the surface facing the separator diaphragm component, the porous body having a thickness of 200-500 μm;
   an anode mesh facing said assembly, arranged on a side opposite the gas-evolving electrode of said porous separator diaphragm;
   wherein said gas-evolving electrode is arranged as the cathode and a tightening pressure of 0.10 to 0.25 kg/cm2 is applied over the major surfaces of said assembly.

7. The electrolyser according to claim 6, wherein said anode mesh is coated with a catalyst.

8. A process for manufacturing hydrogen with a purity exceeding 99.8% comprising feeding an alkaline electrolyte to an electrolyzer and applying a direct current, wherein the electrolyzer is an alkaline water electrolyzer comprising at least one electrolysis cell containing:
   an assembly consisting of one gas-evolving electrode and porous separator diaphragm wherein:
   said separator diaphragm comprises inorganic hydrophilic particulates dispersed in a porous network;
   said gas-evolving electrode is a porous body with a pore size below 100 μm comprising a conductive matrix having an electrocatalyst dispersed therein;
   said gas-evolving electrode having a surface in direct contact without penetration with said separator diaphragm;
   wherein said porous body is a mesoporous or microporous body; and
   wherein the gas-evolving electrode contains at least 80% of the catalyst loading in a 10 to 20 μm-thick layer of the porous body in correspondence of the surface facing the separator diaphragm component, the porous body having a thickness of 200-500 μm;
   an anode mesh facing said assembly, arranged on a side opposite the gas-evolving electrode of said porous separator diaphragm;
   wherein said gas-evolving electrode is arranged as the cathode and a tightening pressure of 0.10 to 0.25 kg/cm2 is applied over the major surfaces of said assembly.

9. The process according to claim 8, wherein said alkaline electrolyte is 5 to 30% wt NaOH or KOH.

10. The assembly according to claim 2, wherein said electrocatalyst is carbon-supported ruthenium or ruthenium oxide.

11. The assembly according to claim 4, wherein said surface of said gas-evolving electrode in direct contact with said separator diaphragm is coated with an ionomer layer.

12. A process for manufacturing hydrogen with a purity exceeding 99.8% comprising feeding an alkaline electrolyte to an electrolyzer and applying a direct current, wherein the electrolyzer is an alkaline water electrolyzer comprising at least one electrolysis cell containing:
   an assembly consisting of one gas-evolving electrode and porous separator diaphragm wherein:
   said separator diaphragm comprises inorganic hydrophilic particulates dispersed in a porous network;
   said gas-evolving electrode is a porous body with a pore size below 100 μm comprising a conductive matrix having an electrocatalyst dispersed therein;
   said gas-evolving electrode having a surface in direct contact without penetration with said separator diaphragm;
   wherein said porous body is a mesoporous or microporous body; and
   wherein the gas-evolving electrode contains at least 80% of the catalyst loading in a 10 to 20 μm-thick layer of the porous body in correspondence of the surface facing the separator diaphragm component, the porous body having a thickness of 200-500 μm;
   an anode mesh facing said assembly, arranged on a side opposite the gas-evolving electrode of said porous separator diaphragm, wherein said anode mesh is coated with a catalyst;
   wherein said gas-evolving electrode is arranged as the cathode and a tightening pressure of 0.10 to 0.25 kg/cm2 is applied over the major surfaces of said assembly.

* * * * *